United States Patent [19]
Gordon et al.

[11] 3,905,130
[45] Sept. 16, 1975

[54] OPHTHALMOLOGICAL MANIKIN WITH FUNDUSCOPIC EYEGROUND PRESENTATION

[75] Inventors: Michael S. Gordon, Miami, Fla.; August Colenbrander, Larksbur, Calif.; Darrell G. Patterson, Miami, Fla.

[73] Assignee: University of Miami, Coral Gables, Fla.

[22] Filed: May 1, 1974

[21] Appl. No.: 465,847

[52] U.S. Cl. .................................. 35/17; 46/165
[51] Int. Cl. ........................................... G09b 23/32
[58] Field of Search ......................... 35/17; 46/165

[56] References Cited
UNITED STATES PATENTS

| | | | |
|---|---|---|---|
| 2,091,936 | 8/1937 | Roberts | 35/17 |
| 3,177,593 | 4/1965 | Loeb | 35/17 |

FOREIGN PATENTS OR APPLICATIONS

| | | | |
|---|---|---|---|
| 107,237 | 4/1875 | France | 35/17 |

Primary Examiner—Harland S. Skogquist
Attorney, Agent, or Firm—Cooper, Dunham, Clark, Griffin & Moran

[57] ABSTRACT

An ophthalmological simulation device having means for simulating the parts and operation of a human eye including a photographic diaphragm for simulating the iris and an associated photosensitive system for controlling the operation thereof; a film strip having a series of transparencies of funduscopic eyeground representations thereon and mounted on a film transport which presents successive eyegrounds to the retinal position in the eye for viewing through the iris aperture or pupil with a conventional ophthalmoscope; and a screen disposed behind the film to backlight the eyegrounds by reflecting the probing light and thus create the effect of an actual ophthalmological examination. A bilateral arrangement is mounted in a manikin head and a system for simulating the use of mydriatic fluid to dilate the pupil for a given period during examination is also presented.

10 Claims, 4 Drawing Figures

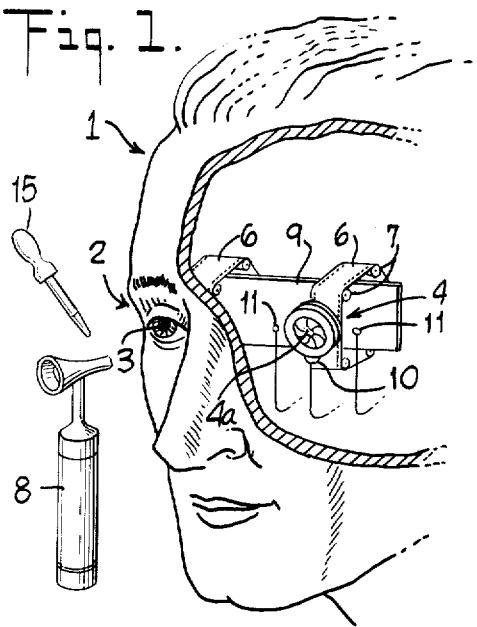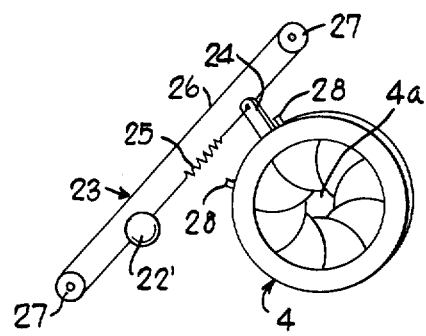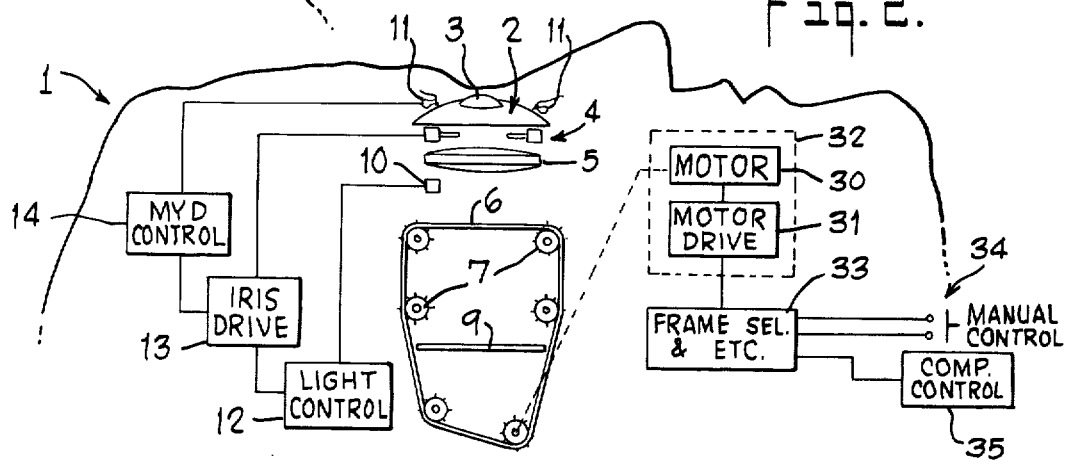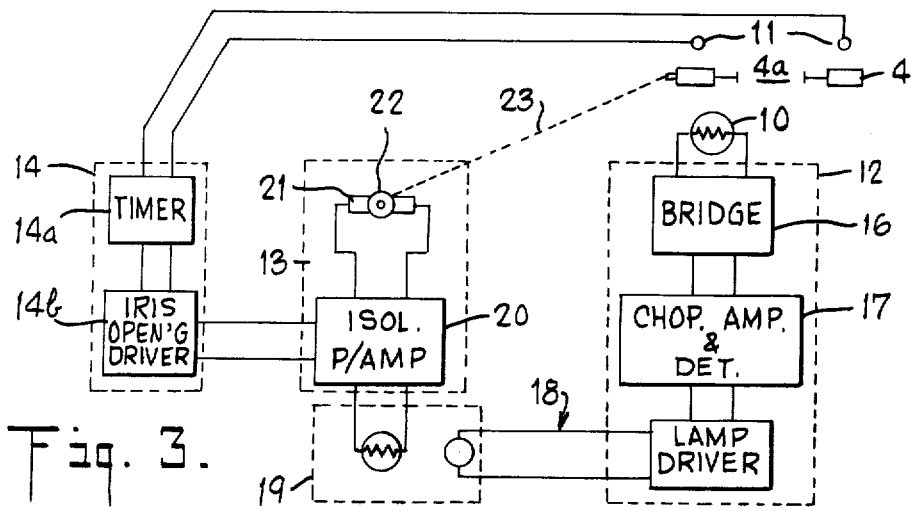

OPHTHALMOLOGICAL MANIKIN WITH FUNDUSCOPIC EYEGROUND PRESENTATION

BACKGROUND OF THE INVENTION

The present invention relates to an ophthalmological training and evaluating simulator and, more particularly, to a system for simulating an actual ophthalmological examination on a human eye with the capability of readily offering a large number of bilateral diverse funduscopic eyeground presentations for observation with an ophthalmoscope.

An important aspect of medical training is the learning of practical diagnostic techniques through working with actual patients. However, as valuable as this experience may be, it can suffer from the limitation that, even in the largest of facilities, the number of diseases encountered among a sampling of patients may be a small percentage of the number of known conditions. Thus, uncommon ailments may frequently go undiagnosed for lack of recognition by students, and even experienced physicians. Also, in view of the random and diverse nature of the diseases to be found among a sampling of patients, it is difficult to establish objective norms in evaluating an individual's clinical diagnostic capabilities.

In order to improve the teaching of ophthalmological diagnostics, some simple training aids for simulating a clinical examination have been developed. For example, in one of these, film slides containing various funduscopic eyeground presentations are manually mounted in an inanimate stand resembling a human head and are viewed through an opening in a simulated eye by means of an opthalmoscope or similar optical probe. While such prior art devices perform a teaching function, they do not provide an indication of the actual conditions encountered in making an ophthalmological examination of a human eye. They further lack the facility for quickly changing the eyegrounds to permit the use of the devices with related animated simulation systems. The present invention is accordingly intended to provide an animated ophthalmological manikin which may be made to automatically simulate the operation of a human eye and rapidly change the eyegrounds in the retinal position so as to be particularly suited for use with other animated manikin systems, such as the cardiological training manikins disclosed in U.S. Pat. Nos. 3,662,076 and 3,665,087.

SUMMARY OF THE INVENTION

The present invention involves an ophthalmological simulation device wherein funduscopic eyegrounds are presented for viewing with an ophthalmoscope through a simulated human eye. A pair of simulated eye mechanisms may be mounted in a suitable manikin head and will comprise: elements for simulating the external portions of two human eyes including transparent corneas; photographic-type diaphragms disposed inside the corneas for simulating a human iris; a photosensitive system for sensing incoming light passing through either of the diaphragm apertures and controlling the operation thereof; optical elements for simulating the lenses of the eyes; two sets of film strips, having a series of transparencies of funduscopic eyeground representations thereon, disposed behind the optical elements and mounted on a film transport which presents the successive eyegrounds bilaterally to the retinal positions in the eyes for illumination by a probing light; and a screen disposed behind the film to backlight the eyegrounds by reflecting the probing light and thus creating the effect of an actual ophthalmological examination to one viewing the film with a conventional ophthalmoscope. The photosensitive system causes the diaphragm apertures to close or constrict when probing light shines through either iris opening in the manner of a human eye. Accordingly, a system for simulating the use of a mydriatic fluid is provided which overrides the photosensitive system control and dilates the pupil during a given period for examination, after which period the iris again constricts, if the probing light is still present.

BRIEF DESCRIPTION OF THE DRAWINGS

FIG. 1 shows a manikin head in accordance with the present invention having a portion broken away to reveal the interior of the simulated eye mechanisms and with an associated ophthalmoscope and mydriatic fluid applicator.

FIG. 2 is a diagrammatic representation of the simulated eye elements and associated operating systems in accordance with the present invention.

FIG. 3 is a schematic diagram showing the details of the iris operating and control system of FIG. 2.

FIG. 4 shows a suitable mechanical system for operating the iris diaphragm.

DETAILED DESCRIPTION OF PREFERRED EMBODIMENT

As shown in FIG. 1, the system of the present invention may be incorporated in a life-size manikin head 1 which may be provided on its own base or be part of a larger manikin unit having other simulated anatomical members for examination such as with the cardiological manikin disclosed in U.S. Pat. No. 3,662,076.

The manikin head 1 has eye openings into which are respectively fitted two elements 2 simulating the exposed portion of a human eye. These elements may be of glass or suitable plastic or plastic coated metal and include transparent corneas 3. Disposed behind each of the transparent corneas 3 are mechanical irises 4 which may be in the form of commercially-available photographic lens aperture assemblies capable of constricting from a normal opening of approximately 11 mm down to approximately 3 mm. Behind each mechanical iris 4 is preferably disposed an optical element 5 for directing light, entering through the opening or pupil 4a of the iris 4, onto a film strip 6 which is mounted on a suitable transport device 7 located immediately beyond the optical element 5. The transparent cornea 3 may also be constructed in the form of an optical element to act in combination with element 5 to provide a suitable lens system or either one may act alone in this regard.

The two film strips 6 contain a series of pictures of funduscopic eyegrounds thereon depicting normal and pathological fundi. Each picture may be viewed as a retinal image, by means of a conventional clinical ophthalmoscope 8, when disposed in the retinal position and backlighted by the examining light beam passing through the pupil 4a. The eye-grounds preferably consist of positive transparency retinal photographs approximately 23 mm in diameter equally spaced with respect to each other on a 35 mm commercial film strip which may be spliced into a continuous loop. The two film loops may be arranged to be synchronized bilateral presentations.

The incoming light preferably passes through the film, or may be optically redirected, but in either event is reflected from a projection screen 9, located behind the film so that the reflective light illuminates the rear surface of the 35 mm film, graphically depicting the subject retinal area as normally seen through a clinical opthalmoscope. The configuration and placement of the screen 9 is selected to maximize the passage of the reflected light back through the film.

The mechanical irises 4 are adapted to respond to external illumination in the manner of human irises through the use of photocells 10 disposed beyond the irises 4, for example, adjacent the optical element 5. As seen, more particularly in FIG. 2, a photocell 10 may be placed adjacent to or in contact with a polished surface of the focusing lens outside diameter to sense the refracted light coming through the pupil 4a. The photocell signal resulting from the light stimulus is fed to a control system 12 whose output operates a drive system 13 to cause both irises to constrict in the manner of human bilateral pupillary constriction. As long as sufficient light stimulus is applied to either eye, the irises will remain in a constricted condition, and then return to normal dilation upon the removal of the light stimulus.

In order to further simulate the activity of a human eye, a system for causing pupillary dilation even when the light stimulus is being applied is preferably provided. This system comprises the locating of suitable electrodes 11 in the manikin eyelids adjacent to the surface of the simulated eye element 2. If the manikin head is to be used in the vertical position, the electrodes 11 may be placed in the lower eyelids and horizontally spaced (FIG. 1), or if the head is used in the horizontal position, the electrodes may be placed in the upper and lower lids (FIG. 2). The electrodes 11 are connected into a control system 14 which will override the light control system 12 in operating the iris drive system 13 when the electrodes 11 are bridged. Thus, a couple of drops of an electrically conductive fluid, for example, undistilled water or a saline solution, may be applied to the surface of the eye element 2, such as by an eye dropper 15 as shown in FIG. 1, in the manner simulating the application of a mydriatic fluid. When the fluid completes the circuit between the electrodes 11 the control system 14 will be caused to operate resulting in the dilation of the pupil 4a to approximately 11 mm. The pupil may be made to remain dilated for the normal physiological period of approximately 2 minutes, by the actuation of an electronic timer 14a (FIG. 3) in control system 14, during which time examining light stimulus may fall on the photocell 10 without causing a constricting action on the pupil 4a. The manikin head 1 may be constructed so that the normal physiological configuration of the eye is duplicated which will permit normal drainage of the fluid from between the electrodes 11. Thus, when the timer operation ceases, an iris opening driver 14b in the override control system 14 will cease to operate, and the pupil will again constrict to the minimum opening if the light stimulus remains. Additional drops of the fluid must then be applied to the eye to reinitiate the operation of the timer 14a and recreate the mydriatic effect for complete viewing of the retinal pictures as in a human eye.

A suitable system and circuitry for controlling the constricting and dilating action of the pupil 14a is shown in greater detail in FIG. 3. The photocell 10 senses the refracted light coming through the pupil and converts it to an electrical value that becomes the reference input of a Wheatstone bridge network 16 in the light control system 12. The output of the bridge 16 is then fed into a chopper, amplifier and detector circuit 17 whose output operates an illumination source driver 18 for an optoelectronic coupler 19. The coupler 19 acts as an isolator eliminating the ground loop potential created by other associated circuits and its output is fed to an in-series power amplifier 20, in the iris drive system 13, which provides voltage polarity and current for operating an iris servomotor 21. The servomotor 21 may be a miniature, bidirectional, 6 volt, direct current, permanent magnet fractional horsepower motor with a 141:1 gear reductive output drive 22. A pulley arrangement 23 converts the rotary force of the output drive to a linear function.

As shown in greater detail in FIG. 4, a commercially available photographic lens aperture assembly is used to simulate the iris constricting and dilating physiology. The mechanical iris reciprocating actuator lever 24 is attached to a tension spring 25 in pulley cord loop 26 that is suspended between the servodrive pulley 22' and idler pulleys 27. An inherent friction developed by the tension spring 25 compensates for the overdrive that may occur if the stimulus light intensity is in excess of the electrical design. Mechanical stops 28 machined in the aperture housing limit the travel of lever 24 and the aperture opening.

Referring again to FIG. 2, it will be seen that any two of the synchronized bilateral eyeground presentations may be disposed in the retinal position by operation of the film transport system 7. The transport system 7 is operated by a motor 30 and motor drive 31 which may be in the form of a small servodrive 32 such as commercially obtainable, along with suitable film drive sprockets and transport spools, from the Mast Development Company of Davenport, Iowa, Model 1,420Y. The servodrive 32 may be operated by a suitable frame selection and direction of film travel circuitry system 33 which may be provided with a manual control 34 or computer control 35 for selecting a desired set of eyeground pictures.

It is contemplated that the present invention is especially suitable for incorporation into the cardiological manikin training system disclosed in previously-mentioned U.S. Pat. No. 3,662,076 wherein the eyeground selection may be accomplished by a disease selector subsystem and coordinated to correspond to the pathological fundi for the cardiological disease programmed into the manikin system.

We claim:

1. An ophthalmological simulation device for presenting funduscopic eyegrounds for viewing with an ophthalmoscope comprising:

a. means for simulating the exposed portion of a human eye including a transparent cornea;

b. adjustable aperture means disposed inside said corena for simulating a human iris;

c. optical means for directing incoming light from said ophthalmoscope passing through said adjustable aperture means;

d. film means having funduscopic eyeground representations thereon disposed behind said adjustable aperture means for presenting said eyeground representations to illumination by said light;

e. reflective means disposed behind said film means for reflecting the incoming light back through said eyeground representations for viewing with said ophthalmoscope; and f. means for sensing the incoming light passing through said adjustable aperture means for controlling the aperture opening.

2. A device as in claim 1 wherein said film means is a film strip containing a series of eyeground representations thereon and further comprising film transport means for moving said film strip to change the particular eyeground representation disposed directly behind said adjustable aperture means.

3. A device as in claim 1 wherein said optical means comprises a lens disposed behind said adjustable aperture means and in front of said film means.

4. A device as in claim 3 wherein said light sensing means comprises a photocell disposed adjacent said lens and control means responsive to a light intensity signal from said photocell for operating said adjustable aperture means.

5. A device as in claim 4 wherein said control means comprises: a bidirectional motor; an output drive on said motor; a pulley system including a cord loop connected to said output drive for reciprocal movement in response to the operation of said motor; and an operator means on said adjustable aperture means connected to said cord loop for operating said adjustable aperture means in response to the movement of said cord loop.

6. A device as in claim 1 wherein said light sensing means comprises a photocell and control means comprising a Wheatstone bridge into which the output of said photocell is connected as a reference input signal; a chopper, amplifier, and detector circuit for sensing the output of said bridge; a lamp driver responsive to the output of said chopper, amplifier, and detector circuit; an optoelectronic coupling means for converting the output from said lamp driver; an isolated power amplifier for receiving the output of said optoelectronic coupling means; and a drive motor responsive to the isolated power amplifier output for operating said adjustable aperture means in accordance with said reference input signal.

7. A device as in claim 1 further comprising iris dilating means disposed adjacent said exposed portion of the simulated eye and comprising spaced electrodes disposed to be contacted by electrically conductive fluids on the surface of the simulated eye and control means responsive to the bridging of said electrodes by a conductive fluid for opening said adjustable aperture means.

8. A device as in claim 7 wherein said control means comprises means for overriding said light sensing means in controlling the adjustable aperture opening.

9. A device as in claim 7 wherein said control means comprises timer means for holding said adjustable aperture means open for a preselected period of time.

10. An opthalmological simulator apparatus comprising:

a. means for simulating the exterior surface of a human eye and having a transparent cornea therein;

b. means for simulating a human iris disposed beyond said transparent cornea and having an adjustable aperture therein;

c. means for proportionally adjusting the size of said aperture in response to the amount of light passing through said cornea;

d. means beyond said cornea and said aperture for presenting funduscopic eyeground representations; and e. opaque reflective means disposed beyond said eyeground representation presenting means for reflecting the light passing through said cornea forwardly through said funduscopic eyeground representations to permit viewing thereof through said cornea and aperture.

* * * * *

UNITED STATES PATENT OFFICE
CERTIFICATE OF CORRECTION

PATENT NO. : 3,905,130
DATED : September 16, 1975
INVENTOR(S) : Michael S. Gordon; August Colenbrander and Darrell G. Patterson It is certified that error appears in the above-identified patent and that said Letters Patent are hereby corrected as shown below:

Col. 4. line 2, change "14a" to --4a--;

line 62, change "corena" to --cornea--.

Signed and Sealed this second Day of December 1975

[SEAL]

Attest:

RUTH C. MASON
*Attesting Officer*

C. MARSHALL DANN
*Commissioner of Patents and Trademarks*